United States Patent
Chavot et al.

(10) Patent No.: US 7,236,351 B2
(45) Date of Patent: Jun. 26, 2007

(54) ARMOURED STATION ELEMENT ARTICULATED TO THE GROUND

(75) Inventors: Michel Chavot, Brison St Innocent (FR); Alain Arnaud, Aix Les Bains (FR)

(73) Assignee: Areva T & D SA, Levallois-Perret Cedex (FR)

( * ) Notice: Subject to any disclaimer, the term of this patent is extended or adjusted under 35 U.S.C. 154(b) by 92 days.

(21) Appl. No.: 10/499,274

(22) PCT Filed: Dec. 20, 2002

(86) PCT No.: PCT/FR02/04504

§ 371 (c)(1),
(2), (4) Date: Feb. 11, 2005

(87) PCT Pub. No.: WO03/055026

PCT Pub. Date: Jul. 3, 2003

(65) Prior Publication Data

US 2005/0141175 A1  Jun. 30, 2005

(30) Foreign Application Priority Data

Dec. 21, 2001 (FR) .................................. 01 16661

(51) Int. Cl.
*H02B 5/04* (2006.01)
(52) U.S. Cl. .................. 361/604; 361/601; 361/602; 307/147; 218/43
(58) Field of Classification Search ................ 361/601, 361/602, 603, 610–612, 620, 621, 622, 641, 361/642; 307/142, 147, 148, 149; 200/48 A, 200/48 B; 248/128, 146, 901, 903; 218/43, 218/57, 59, 75–79, 50, 67, 68, 120, 155, 218/152, 80
See application file for complete search history.

(56) References Cited

U.S. PATENT DOCUMENTS 5,578,805 A * 11/1996 Berger et al. .................. 218/43
6,134,100 A * 10/2000 Hageli et al. ................ 361/605
6,538,875 B2 * 3/2003 Marmonier et al. ........ 361/602

FOREIGN PATENT DOCUMENTS

| DE | 1665664 | * | 6/1966 |
| DE | 1 665 664 | | 3/1971 |
| JP | 03159512 A | * | 7/1991 |
| JP | 02001112152 A | * | 4/2001 |

* cited by examiner

*Primary Examiner*—Michael Datskovskiy
(74) *Attorney, Agent, or Firm*—Thelen Reid Brown Raysman & Steiner LLP

(57) ABSTRACT

The high-voltage metal-clad substation element comprises at least one circuit-breaker connected electrically and mechanically to at least one set of busbars (3, 4) extending along an axis (D) that extends transversely to the longitudinal axis (AX) of the circuit-breaker. The metal case (1) is fixed to the ground via a hinge which allows the case to tilt slightly when said set of busbars (3, 4) expands along said transverse axis (D). This configuration makes it possible to omit or to reduce the use of axial bellows on the set of busbars, thereby reducing the cost of manufacturing the metal-clad substation. Advantageously, in association with the hinge, the metal case is designed to have some flexibility to reduce mechanical stresses when the set of busbars expands.

7 Claims, 2 Drawing Sheets

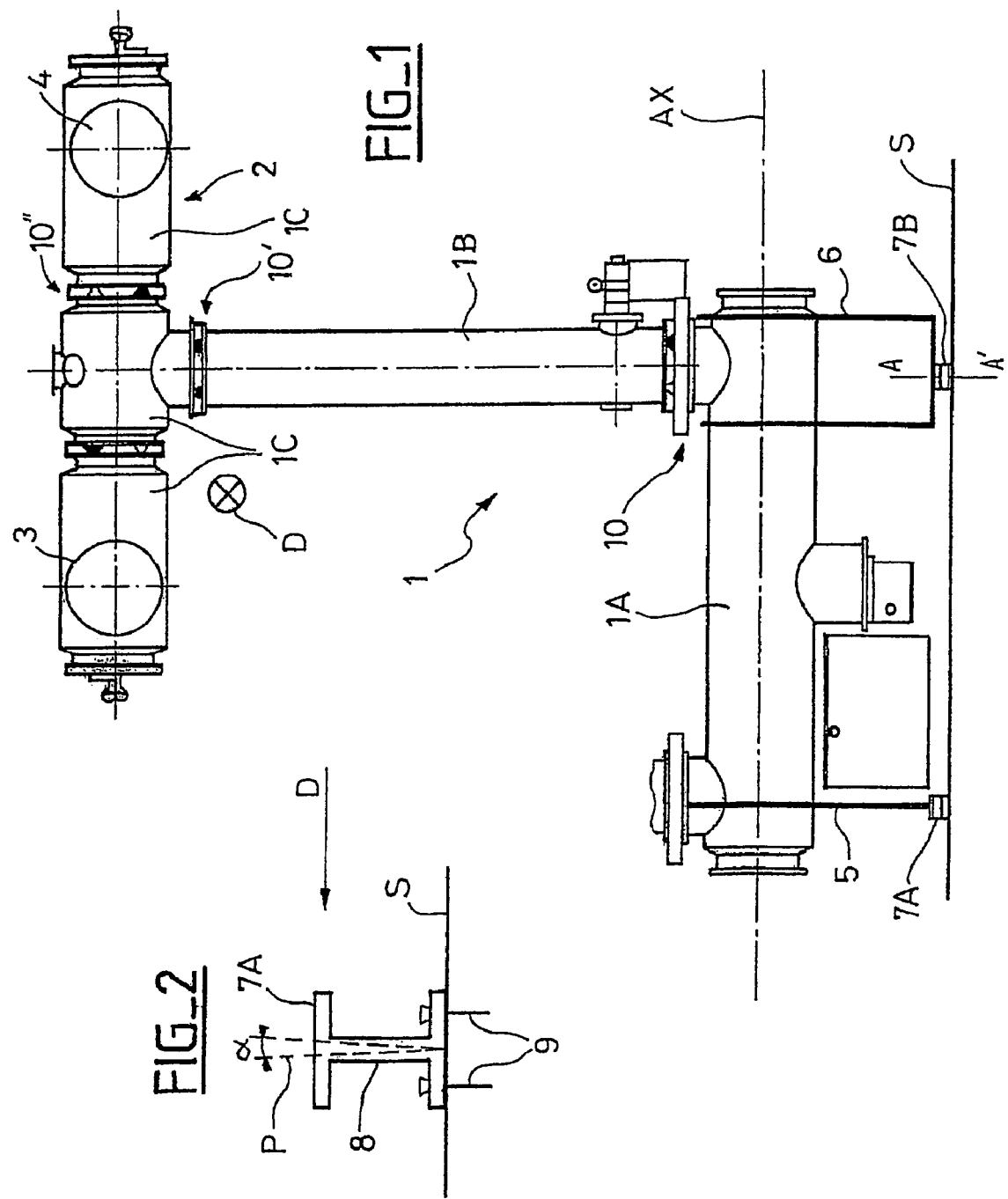

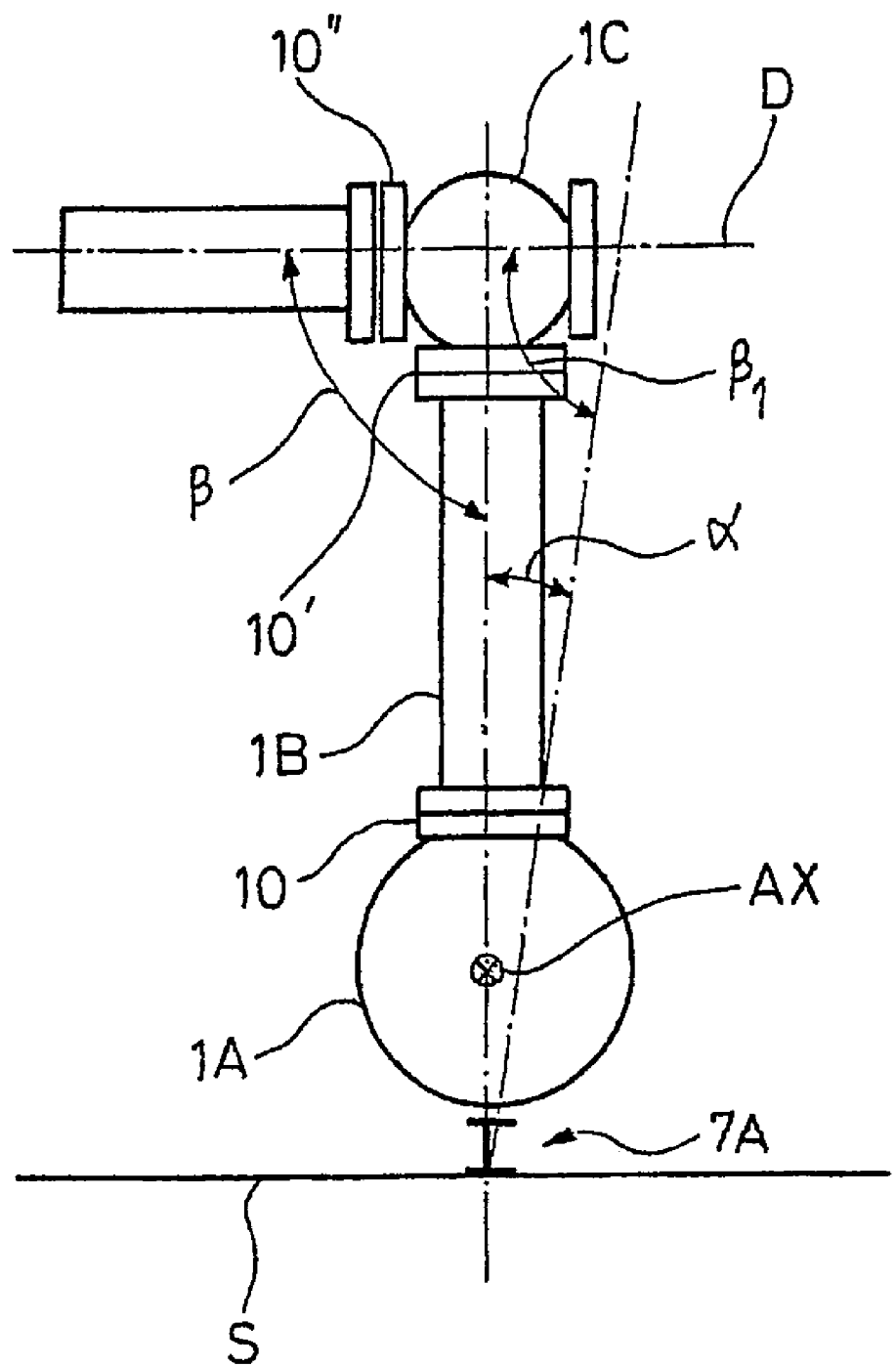
FIG_3

ARMOURED STATION ELEMENT ARTICULATED TO THE GROUND

CROSS-REFERENCE TO RELATED APPLICATION

This application claims priority based on International patent application No. PCT/FR02/04504, filed Dec. 20, 2002 entitled "Armoured Station Element Articulated to the Ground" by Michel Chavot and Alain Arnaud, which claims priority of French Application No. 01/16661, filed on Dec. 21, 2001, and which was not published in English.

The invention relates to a gas-insulated high-voltage metal-clad substation element inside a metal case, that is fixed to the ground, the substation element comprising at least one circuit-breaker connected electrically and mechanically to at least one set of busbars extending along an axis that extends transversely to the longitudinal axis of the circuit-breaker.

The term "high-voltage metal-clad substation element" is used to designate a substation section including at least one circuit-breaker, and the term "metal case" is used to designate overall casing made up by assembling together the individual metal cases cladding the high-voltage busbars and switchgear making up said element. Usually, in such an element the metal case is anchored in the ground The metal case generally comprises a tank surrounding the circuit-breaker and extending along the longitudinal axis of said circuit-breaker. The tank underlies vertical connection pieces consisting, for example, of high-voltage metal-clad busbars, and electrically and mechanically connecting the circuit-breaker to the set of busbars via a common point. The metal case of such a substation element also encloses other electrical switchgear such as, for example, one or more disconnectors mounted at the common point. The set of busbars extends transversely to the longitudinal axis of the circuit-breaker. Conventionally, provision is made to mount axial bellows on the set of busbars to compensate for variations in length due to thermal expansion. More particularly, thermal expansion occurs in the set of busbars due to electrical current flowing through them and to variations in ambient temperature. Such expansion is even more considerable since the material that is in common use for manufacturing such metal cases is aluminum. For a substation including a set of busbars that is 30 meters (m) in length, the expansion of the set of busbars is about 30 millimeters (mm) for an increase in temperature of 40° C.

Conventionally, the axial bellows are disposed along the set of busbars, so as to limit the mechanical stresses to which the metal-clad substation element is subjected, in particular in order to avoid damaging the circuit-breaker and the electrical switchgear.

An object of the invention is to provide a solution that is less costly for compensating for the effects of expansion of the set of busbars connected to the metal case of the substation element.

To this end, the invention provides a gas-insulated high-voltage metal-clad substation element inside a metal case that is fixed to the ground, the substation element comprising at least one circuit-breaker connected electrically and mechanically to at least one set of busbars extending along an axis that extends transversely to the longitudinal axis of the circuit-breaker, said substation element being characterized in that the metal case is fixed to the ground via a hinge which allows the case to tilt slightly when said set of busbars expands along said transverse axis.

At best, such a configuration makes it possible completely to omit axial bellows on the set of bus bars connected to the substation element, and at least to reduce the number of bellows significantly should it not be possible to omit all of them. The hinge may be placed at ground level so as to be remote from the set of busbars, so as to minimize the amplitude of the tilting movement. The hinge may be connected to the metal case either directly or via an intermediate support.

In a particular embodiment of the metal-clad substation element of the invention, the hinge is constituted by at least one metal rail or part anchored in the ground and suitable for flexing on either side of a plane that is substantially perpendicular to said transverse axis. Such a metal rail may, for example, be of I-shaped cross-section, and it may be anchored in the ground by fasteners while being disposed parallel to the longitudinal axis. With this configuration, the hinge cannot be subjected to angular deformation about the transverse axis. Tilting movement to absorb variations in the length of the set of busbars is thus possible only on either side of the vertical plane, and the circuit-breaker is held along the longitudinal axis so as to withstand forces generated when the circuit-breaker is operated.

In another particular embodiment of the invention, the metal case is designed to have some flexibility. With this flexibility, the mechanical stresses in the metal case are reduced further when the set of busbars expands. When the metal case is made up of a plurality of portions interconnected by interconnection zones, one or more of said interconnection zones may be made to be flexible by being made by extrusion and welding or by interposing a hinge bellows.

An embodiment of a high-voltage metal-clad substation element of the invention is described in more detail below and is shown in the figures, in which:

FIG. 1 diagrammatically shows a metal-clad substation element of the invention, with a metal case standing on the ground via two metal rails of I-shaped cross section;

FIG. 2 is a section view on A–A' of FIG. 1, showing a metal rail; and

FIG. 3 is a view on the plane A–A', showing the substation element of the invention.

The high-voltage metal-clad substation element that is shown in part in FIG. 1 includes a gas-insulated high-voltage circuit-breaker inside a metal case 1. The metal case 1 encloses a circuit-breaker which extends along a horizontal longitudinal axis AX, and it is electrically and mechanically connected to a double set of busbars 3, 4 extending along an axis D that extends transversely to the axis AX. Such a metal case is generally made up of an assembly of a plurality of portions interconnected via interconnection zones. In the example shown in FIG. 1, the metal case 1 comprises a tank 1A surrounding the circuit-breaker, with two connection pieces 1B (only one of which is shown) consisting of high-voltage metal-clad busbars whose metal cases are tubular in shape and that extend vertically from the top portion of the tank 1A, each connection piece having its top end connected to a common point 1C which is itself connected to the set of busbars 3, 4. In this example, the common point 1C includes two disconnectors (not shown) which serve to isolate each set of busbars 3, 4 electrically from the circuit-breaker. The metal case may also contain other electrical switchgear (not shown). The various portions of the metal case shown in FIG. 1 are interconnected via interconnection zones 10, 10', and 10" which are described in more detail below.

As shown in FIG. 1, the sets of busbars 3 and 4 extend horizontally above the metal case 1 which is held horizontally on the ground by two metal frames 5 and 6, each of which stands on a metal rail 7A, 7B of I-shaped cross-section. Each of these metal frames 5 and 6 forms a link between a rail 7A, 7B and the metal case 1, and, in this example, said frames form cradles from which the metal case 1 is suspended via a plurality of suspension points. Other configurations with suspension points distributed differently may also be used without going beyond the ambit of the invention. The metal case 1 of the substation element extends along a longitudinal axis AX while the double sets of busbars 3, 4 extend along a transverse axis D which is perpendicular to the axis AX. By expanding, the sets of busbars 3 and 4 become longer along the axis D. The effect of the expansion of the sets of busbars 3 and 4 on the metal case 1 is compensated in the invention by the rails 7A and 7B flexing so as to allow the metal case 1 to tilt when the sets of busbars 3 and 4 expand, the tilting taking place substantially about the longitudinal axis AX. By means of the tilting, the entire metal case 1 and the electrical switchgear situated above the circuit-breaker tilts when the sets of busbars expand, so as to reduce the mechanical constraints in the substation element of the invention.

As shown in FIG. 2, each metal rail of I-shaped cross-section, such as the rail 7A is anchored to the ground S, e.g. by fasteners 9, while being positioned parallel to the longitudinal axis AX. It includes a flexible web 8 which extends in a vertical plane P substantially perpendicular to the transverse axis D, so that each rail 7A, 7B is capable of flexing to either side of the vertical plane P. Since the rails are disposed parallel to the longitudinal axis, the resulting overall hinge prevents any movement of the metal case in the vertical plane P. This configuration makes it possible to hold the metal case 1 of the substation element along the longitudinal axis AX, and thus to prevent any longitudinal displacement of the substation element when the circuit-breaker is operated.

In practice, the angle a of flexing of the rails 7A, 7B on either side of the plane P is about $100^{th}$ of one radian. The metal case is thus enabled to tilt a little by means of the hinge function provided by the flexible element. In practice, implementing a hinge allowing a flexing angle of about $100^{th}$ of one radian compensates for the expansion of a set of busbars whose length is sixty meters, whereas, in the prior art, it is necessary to mount axial bellows every twenty meters along such a set of busbars. Metal rails are naturally much less expensive to manufacture than are axial bellows for busbars. Without going beyond the ambit of the invention, the rails or flexible parts 7A, 7B may be replaced by any type of hinge allowing the metal case 1 to move a little substantially about the longitudinal axis AX.

The metal-cladding element is designed to have some flexibility in order to reduce further the mechanical constraints in the metal case when the set of busbars expands. More particularly, the metal case 1 is designed to accommodate variations in the angle between the vertical connection pieces 1B and the horizontal sets of busbars 3 and 4, such variations being induced by the tilting movement of the metal case 1 when the set of busbars 3 and 4 expand.

This flexibility may be obtained by the construction of the metal case, e.g. by being imparted at one or more interconnection zones via which the various component portions of the metal case 1 are interconnected. In FIG. 3, the metal case 1 includes three flexible interconnection zones 10, 10', and 10'' respectively connecting the tank 1A to the connection piece 1B, connecting the connection piece 1B to the common point 1C, and connecting the common point 1C to the set of busbars 3, 4. At rest, the sets of busbars 3 and 4 form an angle β with the connection pieces 1B of the metal case 1, which angle β is close to the right angle corresponding to the connection pieces being in a vertical position. When the busbars of the set of busbars 3 and 4 expand, the connection pieces 1B are inclined significantly, and they form an angle α with the vertical, so that the angle β closes to take a value referenced $β_1$. This variation in the angle β is absorbed by the flexible interconnection zones 10' and 10'', thereby reducing the mechanical stresses generated in the metal case by the sets of busbars 3 and 4 expanding. As shown in FIG. 3, $β_1=β-α$.

When the metal case is made of aluminum sheet, the flexible interconnection zones may, for example, by made by extrusion and by welding. For example, the interconnection zone 10 between the tank 1A and the connection piece 1B may be made by extruding an opening in the tank to form a projecting collar that is welded to a fixing flange or else directly to the connection piece 1B. As known to the person skilled in the art, by choosing forged aluminum and a radius of curvature suitable for extrusion, it is possible to adjust the flexibility of such an interconnection zone.

When the metal case is made of cast aluminum, a hinge bellows may, for example, be mounted at the interconnection zone 10' between the connection piece 1B and the common point 1C. Such a hinge bellows is much less costly than an axial bellows for a set of busbars, and the cost of the metal-clad substation is thus reduced significantly.

Each element of the metal-clad substation may be hinged to the ground, and, by enabling the axial bellows to be omitted from the sets of busbars in the substation, the invention makes it possible to lower the cost of the substation. Naturally, the invention is applicable to other types of architecture for metal-clad substation elements.

The invention claimed is:

1. A gas-insulated high-voltage metal-clad substation element inside a metal case that is fixed to the ground, the substation element comprising at least one circuit-breaker connected electrically and mechanically to at least one set of busbars extending along an axis that extends transversely to the longitudinal axis of the circuit-breaker, wherein the metal case is fixed to the ground via a hinge which allows the case to tilt slightly when said set of bus bars expands along said transverse axis and in which the hinge is constituted by at least one metal rail or part anchored in the ground and suitable for flexing on either side of a plane that is substantially perpendicular to said transverse axis.

2. A metal-clad substation element according to claim 1, in which said at least one metal rail is of I-shaped cross-section.

3. A metal-clad substation element according to claim 1, in which the metal case is held horizontally on the ground by metal frames, each of which stands on a metal rail or part.

4. A metal-clad substation element according to claim 1, in which the hinge is designed to prevent any movement of said metal case along the longitudinal axis of the circuit-breaker when said circuit-breaker is operated.

5. A metal-clad substation element according to claim 1, in which said metal case has some flexibility in order to minimize the mechanical stresses in the metal case.

6. A metal-clad substation element according to claim 5, in which said metal case is made up of a plurality of portions interconnected via interconnection zones, and in which at least one of said interconnection zones is flexible.

7. A metal-clad substation element according to claim 6, in which at least one of the portions of the metal case is made of cast aluminum, and in which at least one flexible interconnection zone is formed by a hinge bellows.

* * * * *